United States Patent
Beattie, Jr. et al.

(10) Patent No.: US 10,540,696 B2
(45) Date of Patent: Jan. 21, 2020

(54) ENHANCED SHARED MEDIA EXPERIENCES

(71) Applicant: AT&T Intellectual Property I, L.P., Atlanta, GA (US)

(72) Inventors: James Gordon Beattie, Jr., Bergenfield, NJ (US); Stephen Francis Triano, Hillsborough, NJ (US); Roque Rios, III, Middletown, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 925 days.

(21) Appl. No.: 14/501,264

(22) Filed: Sep. 30, 2014

(65) Prior Publication Data
US 2016/0092939 A1 Mar. 31, 2016

(51) Int. Cl.
*G06Q 30/02* (2012.01)
*H04L 29/08* (2006.01)
*H04L 29/06* (2006.01)
*H04N 21/4788* (2011.01)
*H04N 21/81* (2011.01)

(52) U.S. Cl.
CPC ..... *G06Q 30/0277* (2013.01); *G06Q 30/0269* (2013.01); *H04L 65/4084* (2013.01); *H04L 65/602* (2013.01); *H04L 65/605* (2013.01); *H04L 67/04* (2013.01); *H04L 67/10* (2013.01); *H04L 67/18* (2013.01); *H04L 67/30* (2013.01); *H04L 67/306* (2013.01); *H04N 21/4788* (2013.01); *H04N 21/812* (2013.01)

(58) Field of Classification Search
CPC .................................................. G06Q 30/0269
USPC ...................................................... 705/14.66
See application file for complete search history.

(56) References Cited

U.S. PATENT DOCUMENTS

| | | | |
|---|---|---|---|
| 8,006,270 B2 | 8/2011 | Martini et al. | |
| 8,060,399 B2 | 11/2011 | Ullah | |
| 8,250,136 B2 | 8/2012 | Maekawa et al. | |
| 8,572,257 B2 | 10/2013 | Dua | |
| 8,621,504 B2 | 12/2013 | Reynolds et al. | |
| 8,635,674 B2 | 1/2014 | Bhatia et al. | |
| 8,683,502 B2 | 3/2014 | Shkedi et al. | |
| 2006/0225107 A1 | 10/2006 | Seetharaman et al. | |
| 2010/0146567 A1 | 6/2010 | Mehta et al. | |
| 2010/0269138 A1* | 10/2010 | Krikorian | H04N 21/23406 725/39 |
| 2011/0047584 A1 | 2/2011 | Codadeen | |
| 2011/0131623 A1 | 6/2011 | Kang et al. | |
| 2011/0314497 A1 | 12/2011 | Warrick et al. | |

(Continued)

FOREIGN PATENT DOCUMENTS

| | | |
|---|---|---|
| CN | 101917428 A | 12/2010 |
| CN | 103220554 A | 7/2013 |

OTHER PUBLICATIONS

Punchihewa, Amal, Ann Malsha De Silva, and Yongseng Diao. "Internet Protocol Television (IPTV).", 2010, 60 pages.

*Primary Examiner* — Azam A Ansari
(74) *Attorney, Agent, or Firm* — Greenblum & Bernstein, P.L.C.

(57) ABSTRACT

Enhanced shared media experiences allow viewer's personal devices to receive targeted content. Targeting advertisements and other content to personal devices is cheaper and more effective than broadcast delivery. Advertisers may still target their advertisements during popular programming with purchasing expensive broadcast advertising slots.

17 Claims, 22 Drawing Sheets

(56) References Cited

U.S. PATENT DOCUMENTS

| | | | |
|---|---|---|---|
| 2013/0042263 A1 | 2/2013 | Reynolds | |
| 2013/0152139 A1* | 6/2013 | Davis | H04N 21/482 |
| | | | 725/61 |
| 2013/0170813 A1* | 7/2013 | Woods | H04N 5/765 |
| | | | 386/200 |
| 2015/0026708 A1* | 1/2015 | Ahmed | H04N 5/23206 |
| | | | 725/12 |

* cited by examiner

ENHANCED SHARED MEDIA EXPERIENCES

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Targeted content improves advertising. Advertisements and other content may be tailored to personal interests, which is less expensive and more effective. However, in a shared media experience, targeted content is disruptive and cumbersome.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
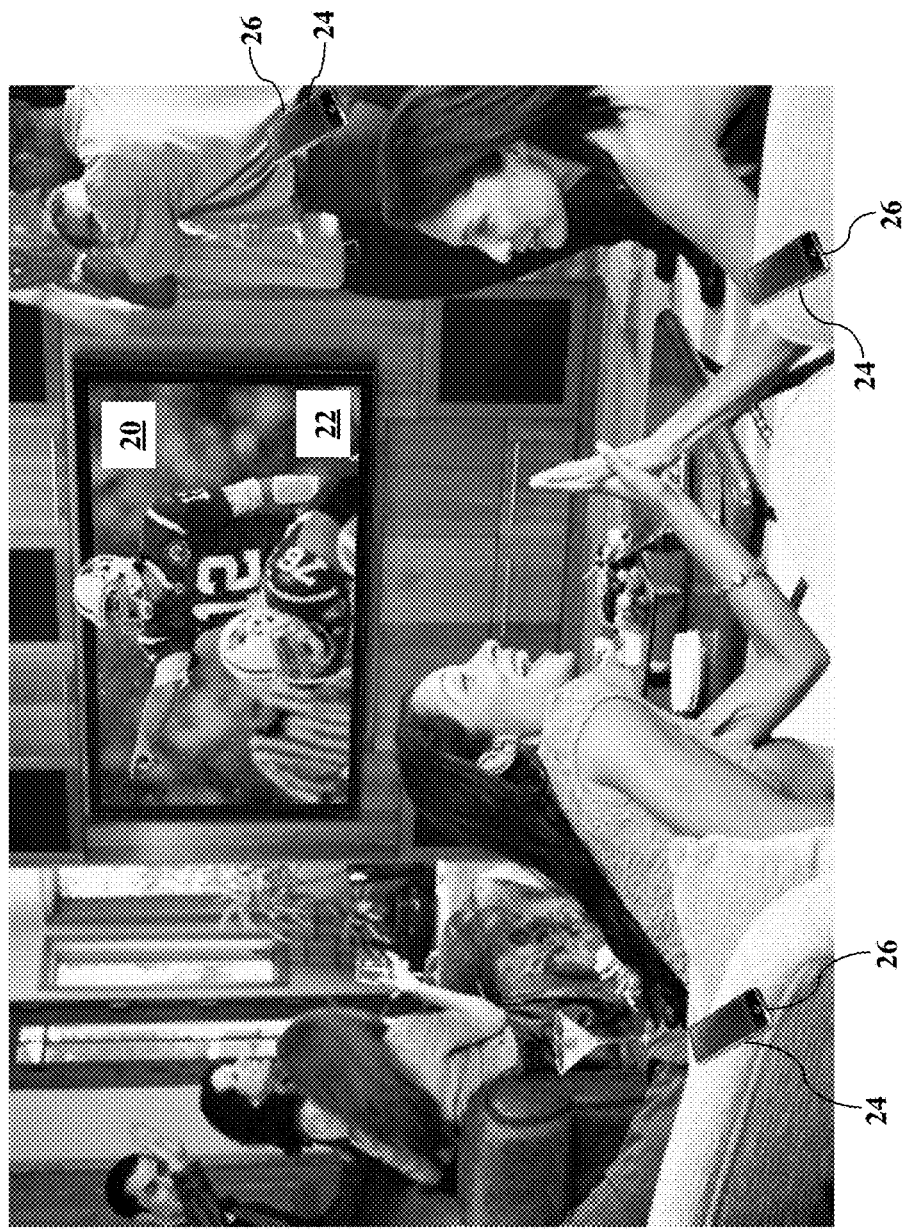
FIGS. 1-4 are simplified schematics illustrating an environment in which exemplary embodiments may be implemented.

FIGS. 1-4 are simplified schematics illustrating an environment in which exemplary embodiments may be implemented. FIG. 1 illustrates a common, shared media experience. Friends and family gather to watch some content 20 displayed by a monitor 22. FIG. 1, for simplicity, illustrates the content 20 as an American football game, but the content 20 may be any movie, program, or sporting event. Regardless, even though the viewers watch the content 20 on the monitor 22, supplemental content 24 is targeted to the personal devices 26 of the viewers. That is, advertisements and other targeted messages are tailored to the personal devices 26 of the viewers. So, as the football game progresses, advertisers may match their products and services to the personal profiles of the viewers, without spending large sums for impersonal advertising opportunities during the broadcast stream of the content 20. Indeed, advertising time during popular events (such as sporting events) may cost millions of dollars per minute. Studies have shown that the targeted, supplemental content 24 is much less expensive and more effective.

Figure 2:
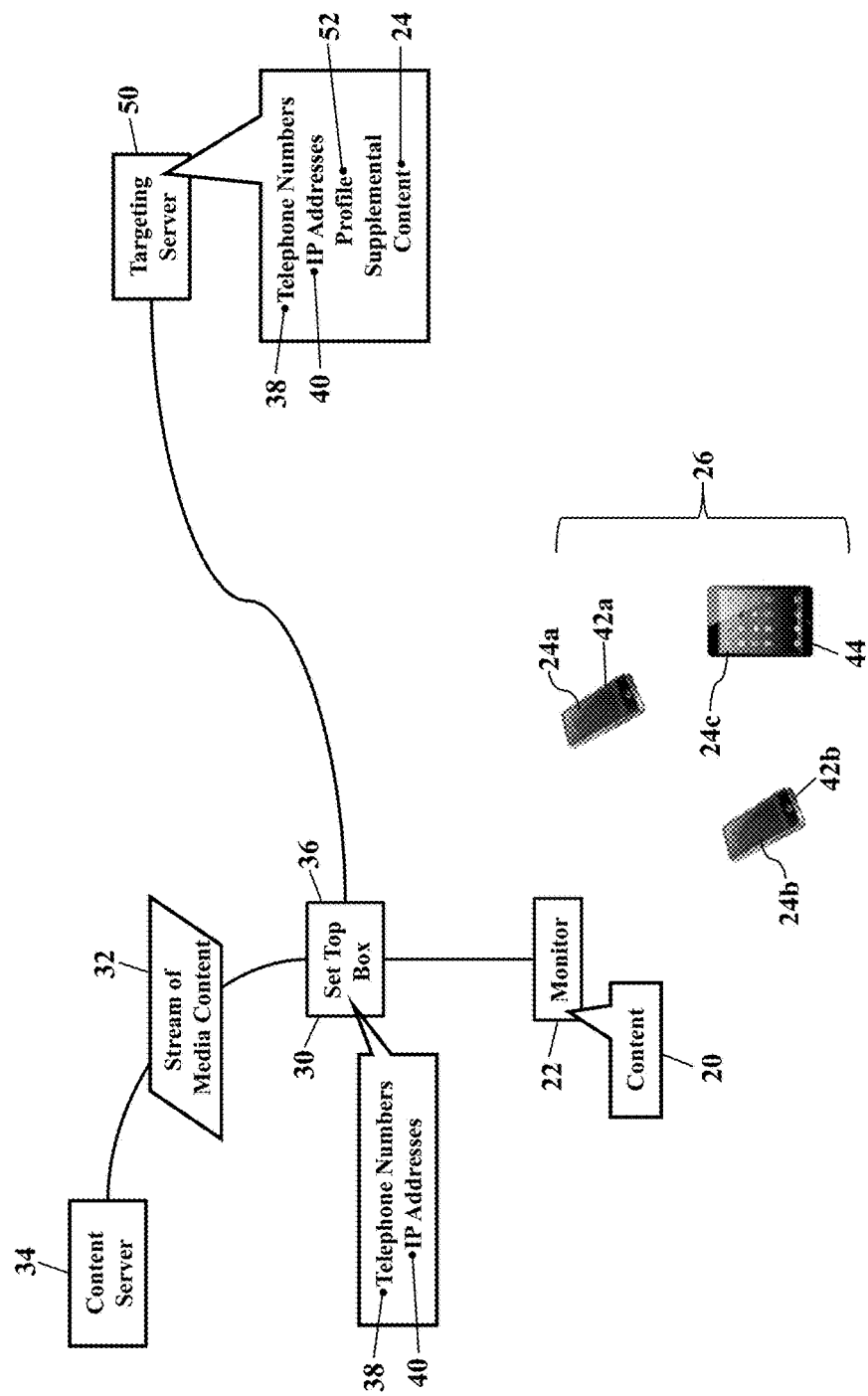

FIG. 2 further illustrates the shared media experience. A media device 30 receives the content 20 as a stream 32 of media content from a content server 34. The media device 30 is illustrated as a set-top box 36, which is common in many homes and businesses. The media device 30, however, may be the APPLE® TV, ROKU®, or any other information appliance or component that processes the stream 32 of media content for display by a television or the monitor 22. Regardless, exemplary embodiments also identify the personal devices 26 within the viewing area of the monitor 22. Exemplary embodiments, for example, collect the telephone numbers 38 and/or the Internet Protocol addresses 40 of the mobile smartphones 42 and tablet computers 44 in viewing proximity to the monitor 22. The telephone numbers 38 and the Internet Protocol addresses 40 are sent to a targeting server 50. The targeting server 50 obtains a profile 52 associated with each one of the telephone numbers 38 and the Internet Protocol addresses 40. The targeting server 50 analyzes each profile 52 and determines the supplemental content 24 that appeals to each profile 52. Profile targeting is well known, and the details are beyond the scope of this disclosure. However, once the supplemental content 24 is tailored to each personal device 26, the individually tailored, supplemental content 24 is sent to the corresponding telephone number 38 or the Internet Protocol address 40. That is, the supplemental content 24 is destined for the network address assigned to each respective viewer's personal device 26, not the set top box 36 receiving the stream 32 of media content. A first viewer's smartphone 42a, for example, receives a first supplemental content 24a, while a second viewer's smartphone 42b receives a second supplemental content 24b. The viewer's table computer 44 receives her corresponding third supplemental content 24c. Again, then, even though the viewers share the content 20 on the monitor 22, each viewer's personalized, supplemental content 24 is targeted and separately delivered to their personal device 26. Targeted advertisements may be sent to each viewer's personal device 26, without waiting for advertising opportunities in the stream 32 of media content.

Exemplary embodiments enhance the shared media experience. As the viewers watch the content 20 on the monitor 22, exemplary embodiments enhance the shared media experience in an individualized format using their personal devices 26 as a second display screen. For example, should five friends gather to watch the content 20, all five friends have different feeds on their secondary screen. The different supplemental contents 24 are individually tailored to his or her interests, approach, time and/or physical context. Exemplary embodiments thus highlight the potential asymmetry of the service experience. Each viewing user's personal device 26 may thus automatically receive, via an Internet Protocol or other delivery mechanism, content tailored to their specific interests or focus. An adult sports fan, as one example, may be provided with information that is different than a non-sports fan or a youth, but each user will be provided with advertisements and informational content that is tailored to their interests and age. If an individual is working, or outside their home, then physical context may be added to the decision to provide augmented content that may be different from that which might be provided in those contexts.

Exemplary embodiments are not disruptive. Conventionally, if a viewer wanted information about an actor or product shown in the content 20, the viewer would need to stop the content 20, or split the viewing screen, and query for the content title, actor's name, or other search term. This query process is disruptive to the other viewers' enjoyment of the content 20. Exemplary embodiments, however, target the supplemental content 24 without disrupting the content 20. Once the personal devices 26 are identified, the different supplemental contents 24 are sent to each personal device 26, based on the personalized profile 52. Targeted advertising is effectively delivered without disrupting the shared media experience of all the viewers.

Figure 3:
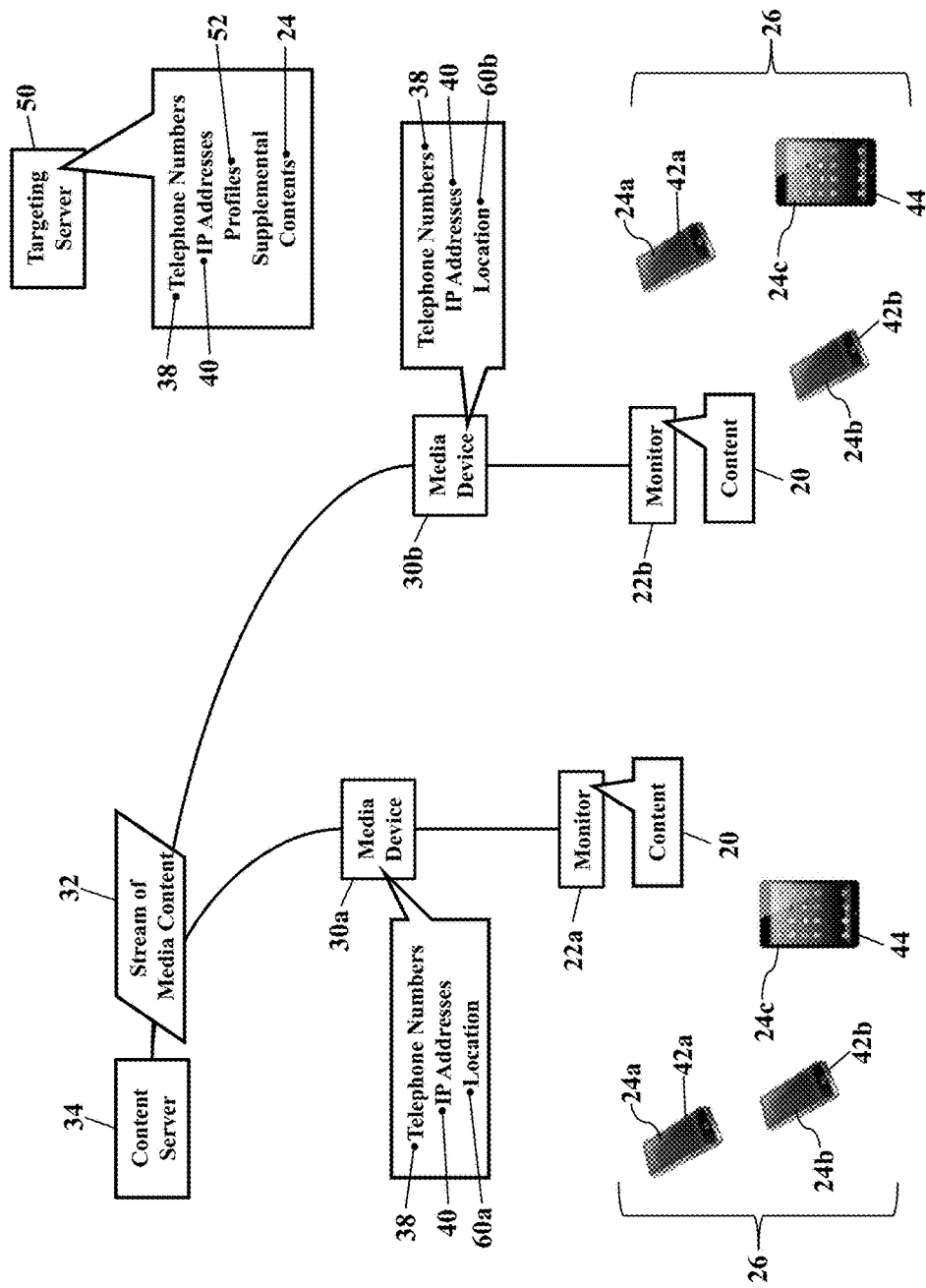

FIG. 3 illustrates a remote, shared media experience. The above paragraphs primarily explain the shared media experience for the viewers in the same room or other physical proximity. Exemplary embodiments, though, may be applied to viewers and their personal devices 26 not in the same location or context. FIG. 3, for example, illustrates multiple copies of the stream 32 of media content being sent to different media devices 30a and 30b at different locations 60a and 60b. In today's networked environment, people may share the same movie, sporting event, or other content 20 from different physical locations. Each media device 30a and 30b processes the content 20 for display on their respective monitors 22a and 22b. Each media device 30a and 30b also sends the telephone numbers 38 and/or the Internet Protocol addresses 40 in its viewing proximity to the targeting server 50 for profiling. Exemplary embodiments may thus identify the personal device 26, regardless of the location 60 associated with each personal device 26. The supplemental content 24 may be tailored to each personal device 26, without regard to the location 60.

Figure 4:
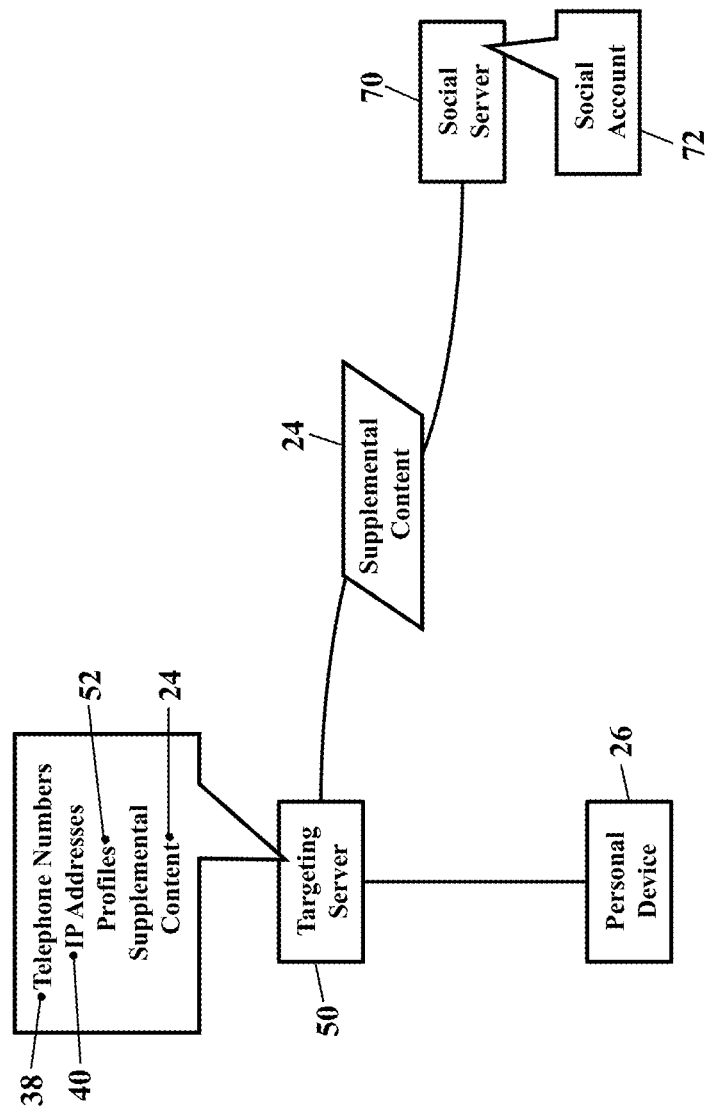

FIG. 4 illustrates social postings. Exemplary embodiments also permit the supplemental content 24 to be posted to each person's social media outlet (such as FACEBOOK® or INSTAGRAM®). Even though the supplemental content 24 may be derived from each user's personal device 26, the supplemental content 24 may be sent to a network address of a social server 70 for posting to the user's social account 72. Indeed, the supplemental content 24 may even be tailored to each user's social account 72.

Figure 5:
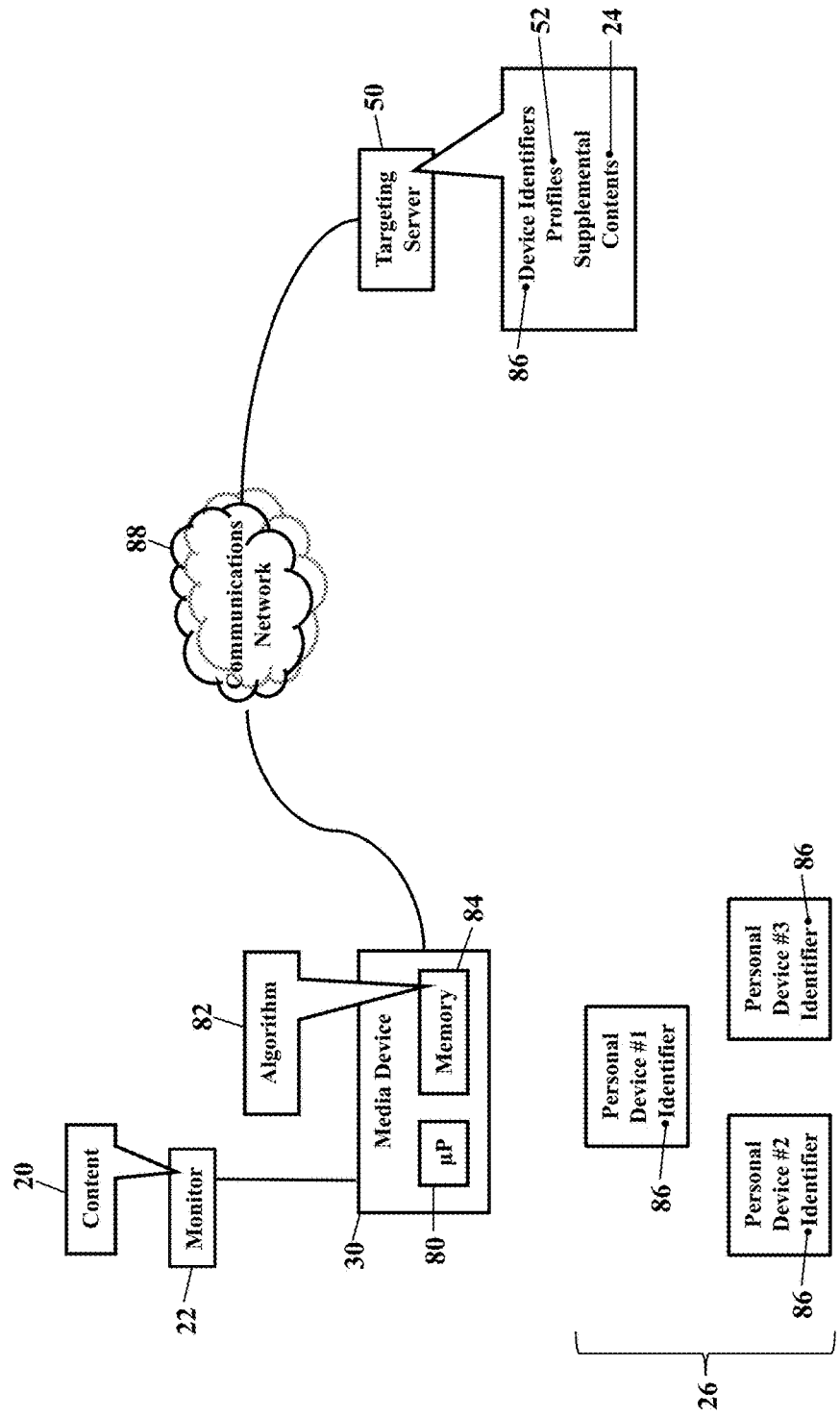
FIG. 5 is a more detailed schematic illustrating the operating environment, according to exemplary embodiments.
Figure 6:
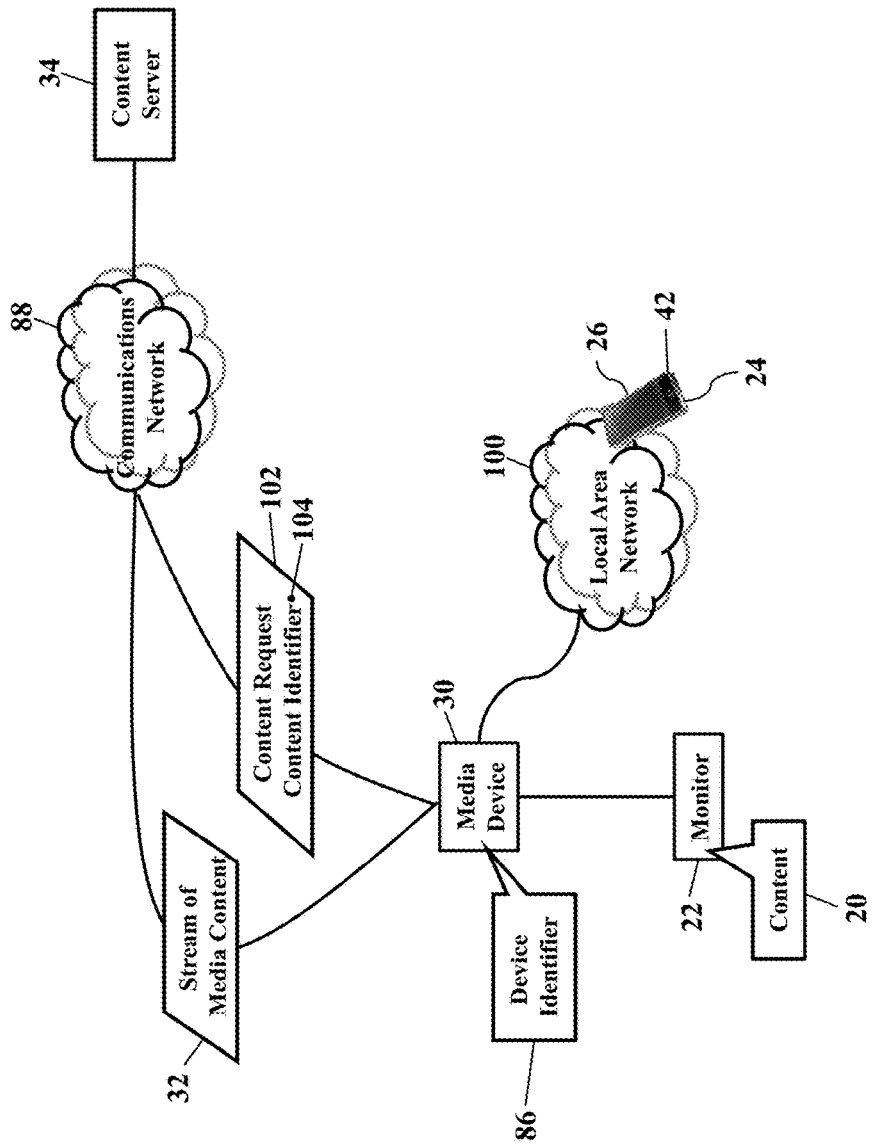
FIGS. 6-9 are schematics illustrating registration, according to exemplary embodiments.

FIG. 5 is a more detailed schematic illustrating the operating environment, according to exemplary embodiments. The media device 30 has a processor 80 (e.g., "µP"), application specific integrated circuit (ASIC), or other component that executes an algorithm 82 stored in a local memory 84. The algorithm 82 instructs the processor 80 to perform operations, such as collecting device identifiers 86 of the personal devices 26. As those of ordinary skill in the art understand, each device identifier 86 may be any alphanumeric arrangement that uniquely identifies the corresponding personal device 26 (such as the telephone number 38 or the Internet Protocol address 40 illustrated in FIGS. 2-4). After the device identifiers 86 are retrieved, the media device 30 groups or sends the device identifiers 86 into a communications network 88 in one or more messages to the targeting server 50. The targeting server 50 obtains the profile 52 associated with each one of the device identifiers 86. The targeting server 50 retrieves the supplemental content 24 that appeals to each profile 52. The supplemental content 24 is then addressed to each one of the device identifiers 86. As the viewers share the content 20 on the monitor 22, each viewer's personalized, supplemental content 24 is targeted to their personal device 26.

FIGS. 6-9 are schematics illustrating registration, according to exemplary embodiments. Here any user may simply register their personal device 26 to receive the supplemental content 24. Whenever the media device 30 processes the content 20 for display, the media device 30 may also identify the personal devices 26 in the room or other viewing area. For example, the media device 30 may establish communication with the user's personal device 26 (such as her smartphone 42). The user's personal device 26 registers by sending its device identifier 86 to the media device 30 using a wireless or wired local area network 100. The user's personal device 26, in other words, may voluntarily opt in to receive the supplemental content 24. The media device 30 similarly registers any other device identifiers 86 discovered within its proximity (such as the viewing area of the monitor 22). The media device 30 then generates a content request 102, which is sent into the communications network 88 to the network address of the content server 34. The content request 102 identifies a title or other unique content identifier 104 of the requested content 20 to be shown on the monitor 22. The content server 34 routes the corresponding stream 32 of media content to the network address associated with the media device 30. The media device 30 processes the stream 32 of media content for display by the monitor 22, which is conventional and need not be explained.

Figure 7:
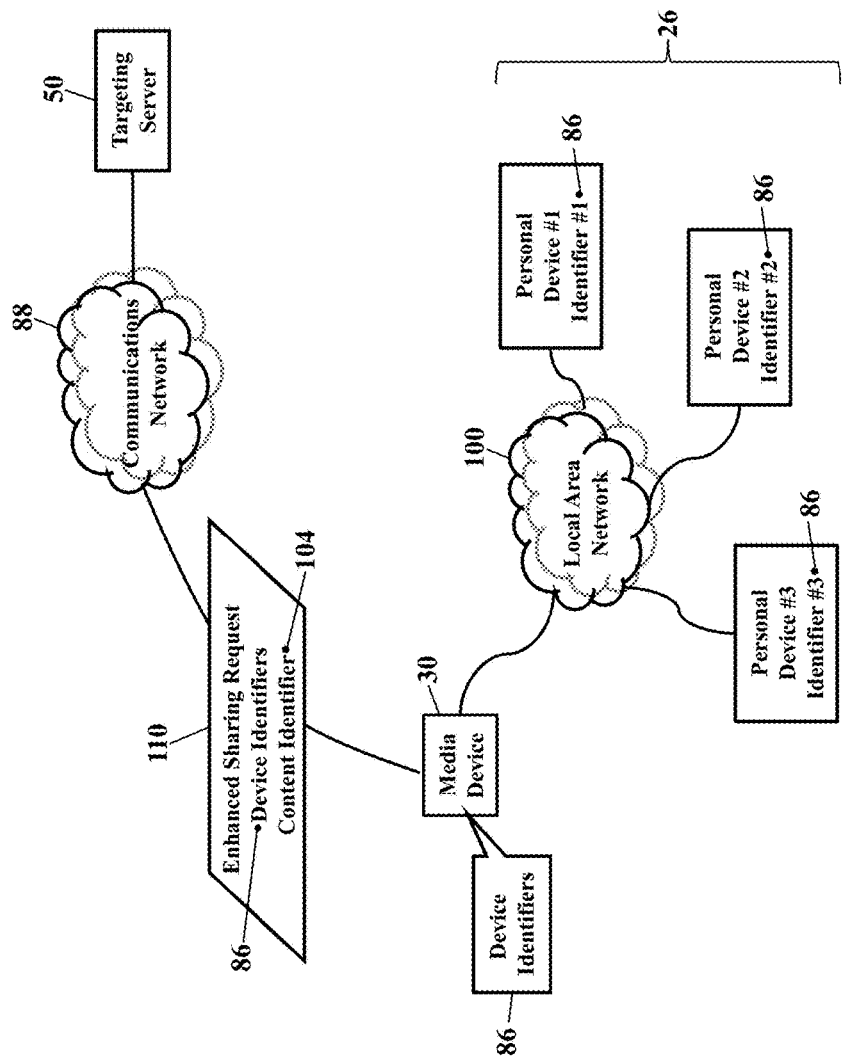

FIG. 7, though, illustrates an enhanced sharing request 110. Once the media device 30 obtains the device identifiers 86 that registered to receive their personalized supplemental content 24, the media device 30 generates the enhanced sharing request 110. The enhanced sharing request 110 includes or lists each one of the device identifiers 86. The enhanced sharing request 110 also includes the unique content identifier 104 of the requested content 20. The media device 30 may thus group the device identifiers 86 into one or more packets and/or messages that are sent into the communications network 88 to the network address of the targeting server 50.

Figure 8:
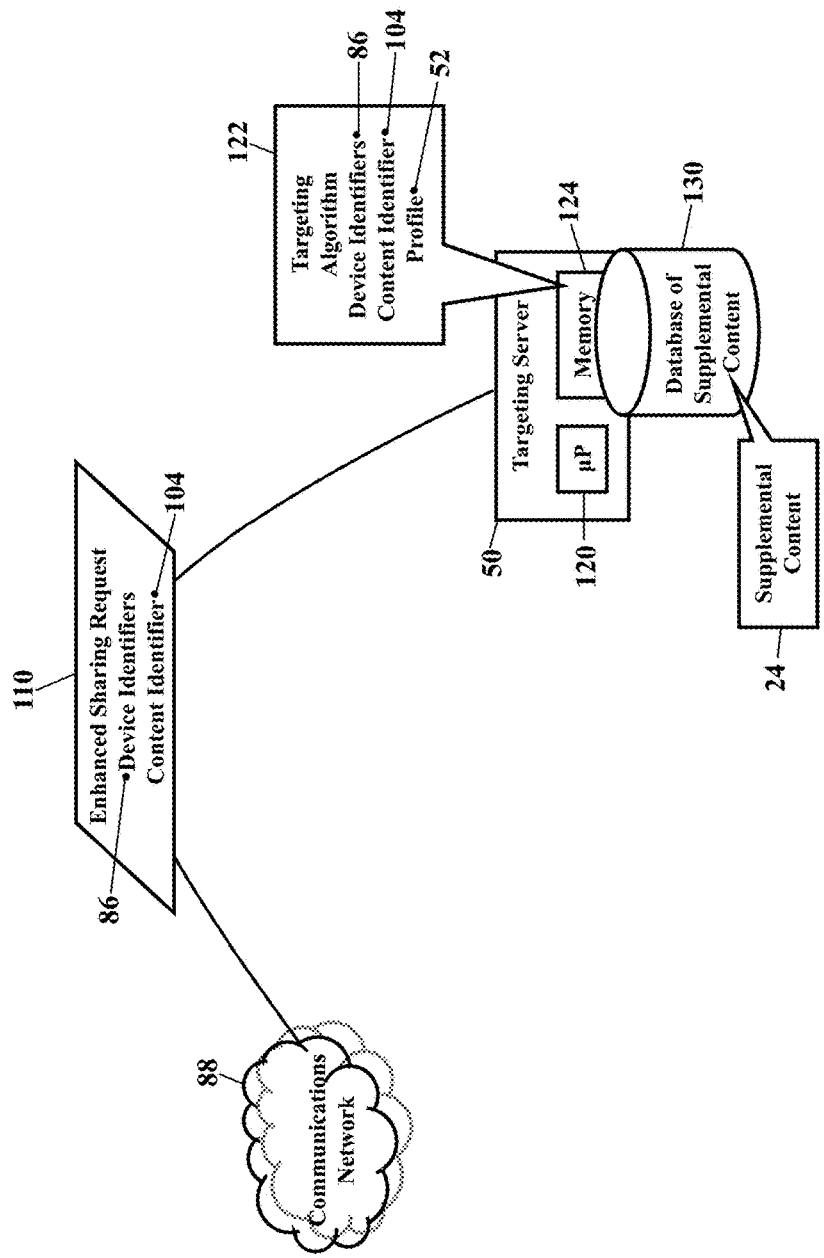

FIG. 8 illustrates profiling. When the targeting server 50 receives the enhanced sharing request 110, the targeting server 50 inspects the enhanced sharing request 110 for a listing of the device identifiers 86 and the unique content identifier 104. The targeting server 50 has a processor 120 (e.g., "µP"), application specific integrated circuit (ASIC), or other component that executes a targeting algorithm 122 stored in a local memory 124. The targeting algorithm 8-122 instructs the processor 120 to perform operations, such as retrieving the profile 52 associated with each one of the device identifiers 86. Once each profile 52 is obtained, the targeting algorithm 122 may then cause the processor 120 to determine the supplemental content 24 that appeals to each viewer's profile 52. The targeting server 50, for example, may query a database 130 of supplemental content. The database 130 of supplemental content stores different advertisements and other content that appeal to different attributes in each viewer's profile 52. The targeting algorithm 122 may thus cause the processor 120 to query the database 130 of supplemental content for attributes or associations with the profile 52. Profile targeting and content recommendations are well known, so the details need not be further described. The targeting server 50 retrieves the supplemental content 24, based on a match to the user's profile 52 (using her device identifier 86).

Figure 9:
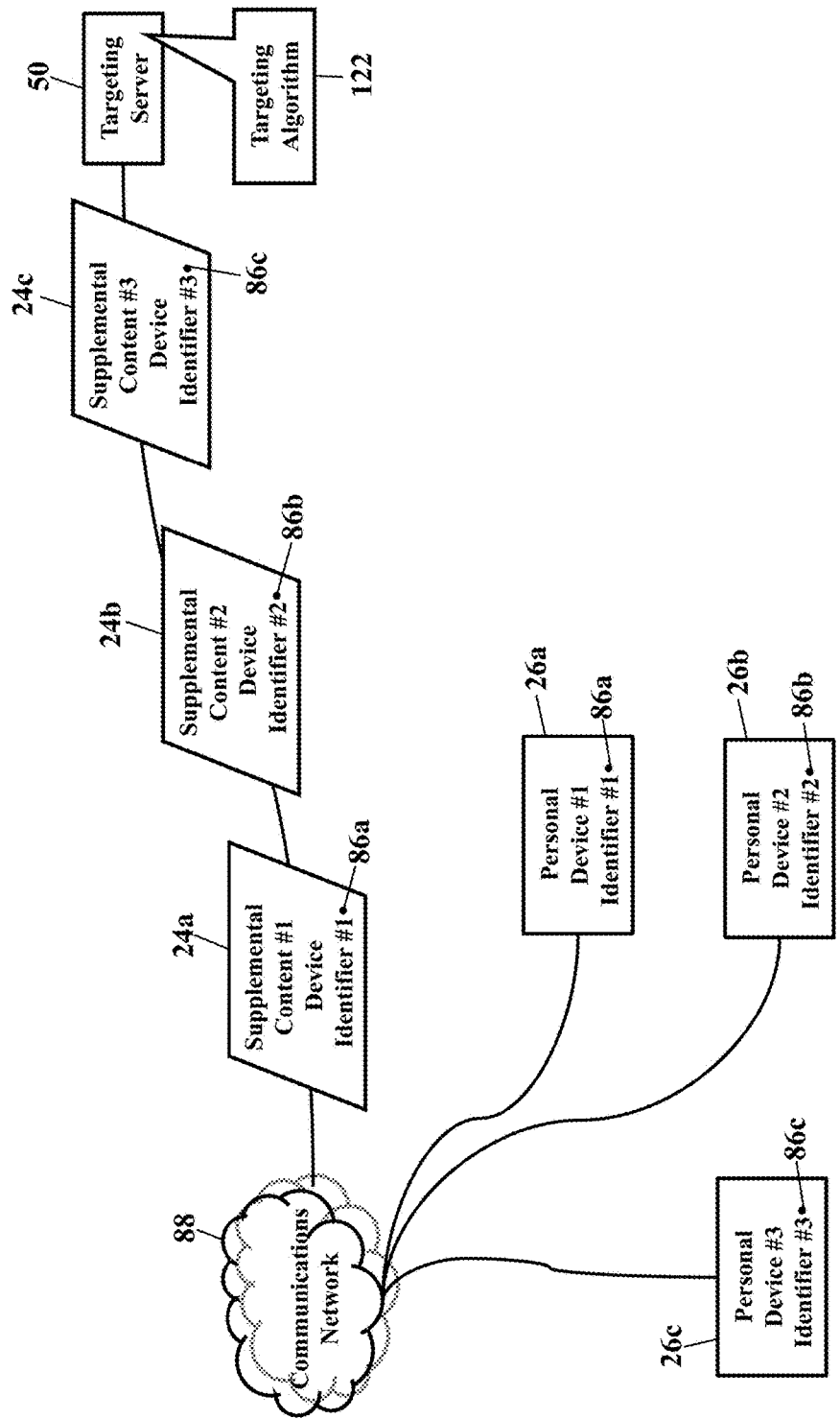

FIG. 9 illustrates delivery of the supplemental content 24. Once the supplemental content 24 is retrieved for each viewer's personal device 26, the targeting algorithm 122 causes the processor 120 to route each supplemental content 24 into the communications network 88 for delivery to the corresponding device identifier 86. The targeting server 50, for example, sends the first supplemental content 24a as packets or messages to the first personal device 26a at the destination identified by the first device identifier 86a. The targeting server 50 sends the second supplemental content 24b as different packets or messages to the different second device identifier 86b, and the third supplemental content 24c is addressed to the third device identifier 86c. The targeting server 50 thus targets different supplemental content 24 to each different personal device 26. Each viewer's personalized, supplemental content 24 is targeted to their respective personal device 26.

Figure 10:
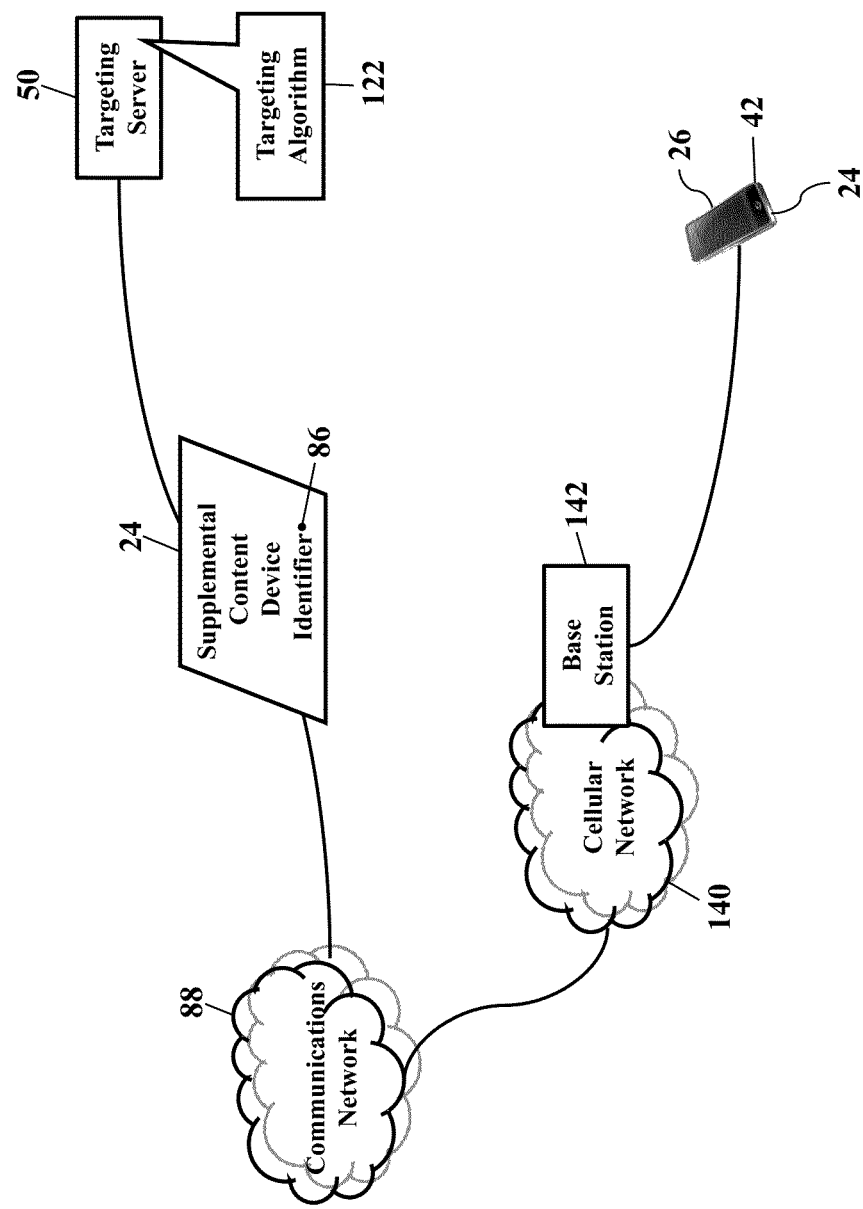
FIG. 10 is a schematic illustrating cellular delivery, according to exemplary embodiments.

FIG. 10 is a schematic illustrating cellular delivery, according to exemplary embodiments. Once the supplemental content 24 is retrieved, intelligence in the communications network 88 may route the supplemental content 24 into a cellular network 140 for delivery to the user's personal device 26. The cellular network 140, for example, may route the supplemental content 24 to a base station 142 serving the user's mobile smartphone 42. The supplemental content 24 is transmitted from an associated antenna, which is wirelessly received by the user's mobile smartphone 42. The details of cellular delivery are well known and need not be further described.

Figure 11:
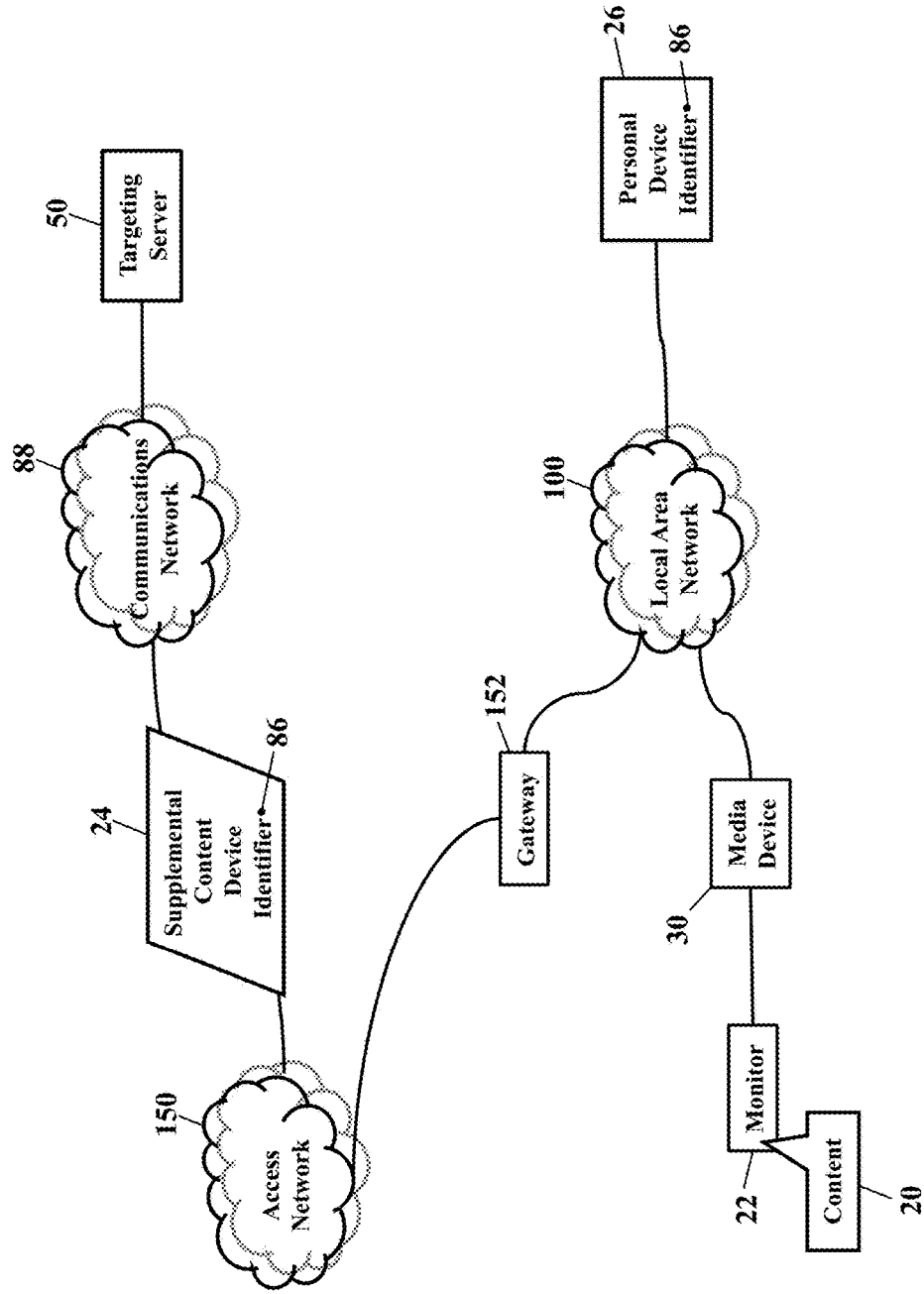
FIG. 11 is a schematic illustrating local delivery, according to exemplary embodiments.

FIG. 11 is a schematic illustrating local delivery, according to exemplary embodiments. Here the supplemental content 24 is delivered using the local area network 100 (such as a residential or business WI-FI® network). Intelligence in the communications network 88 may route the supplemental content 24 to a destination network address in the local area network 100. That is, if the user's personal device 26 is currently registered with the local area network 100, the supplemental content 24 may route into an access network 150 and to a gateway 152 serving the local area network 100. The gateway 152 may function as, or include, a modem, switch, or router interface to the access network 152. When the gateway 152 receives the supplemental content 24, the gateway 152 routes the supplemental content 24 to the network address assigned to the respective user's personal device 26. That is, the supplemental content 24 is destined for the network address assigned to each respective viewer's personal device 26, not the media device 30 processing the content 20 for display by the monitor 22. So, as the viewers enjoy the shared content 20, the viewer's personal device 26 receives the personalized, supplemental content 24 delivered by the local area network 100.

Figure 12:
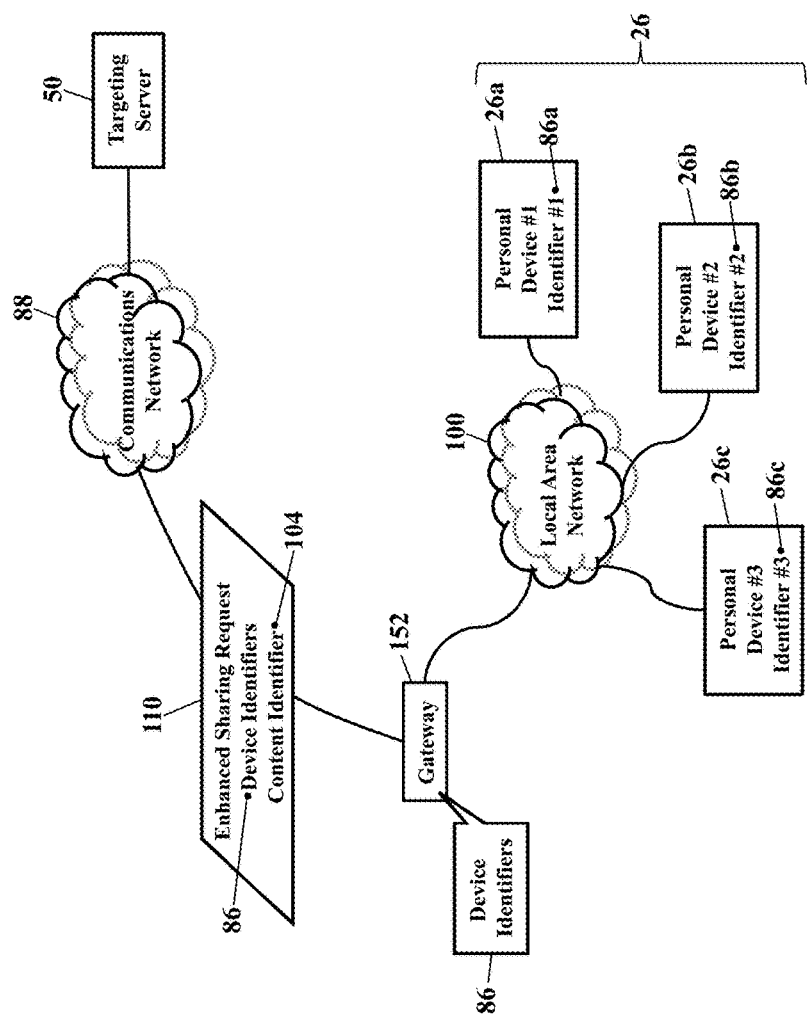
FIG. 12 is a schematic illustrating collection of device identifiers, according to exemplary embodiments.

FIG. 12 is a schematic illustrating collection of the device identifiers 86, according to exemplary embodiments. Here again registration may be used to obtain the device identifiers 86. Whenever one of the personal devices 26 registers with the local area network 100, the corresponding device identifier 86 may be added to the enhanced sharing request 110. As the friends and family members arrive to share the content 20, their personal devices 26 find and register with, and wirelessly connect to, the local area network 100. The gateway 152, for example, may retrieve the device identifiers 86 that are registered with the local area network 100. When the gateway 152 sends the enhanced sharing request 110, the gateway 152 may add the device identifiers 86 of any personal devices 26 currently registered with the local area network 100. The enhanced sharing request 110 thus lists any or all of the device identifiers 86 recognized in the local area network 100. The gateway 152 then routes the enhanced sharing request 110 for profiling, as above explained.

Figure 13:
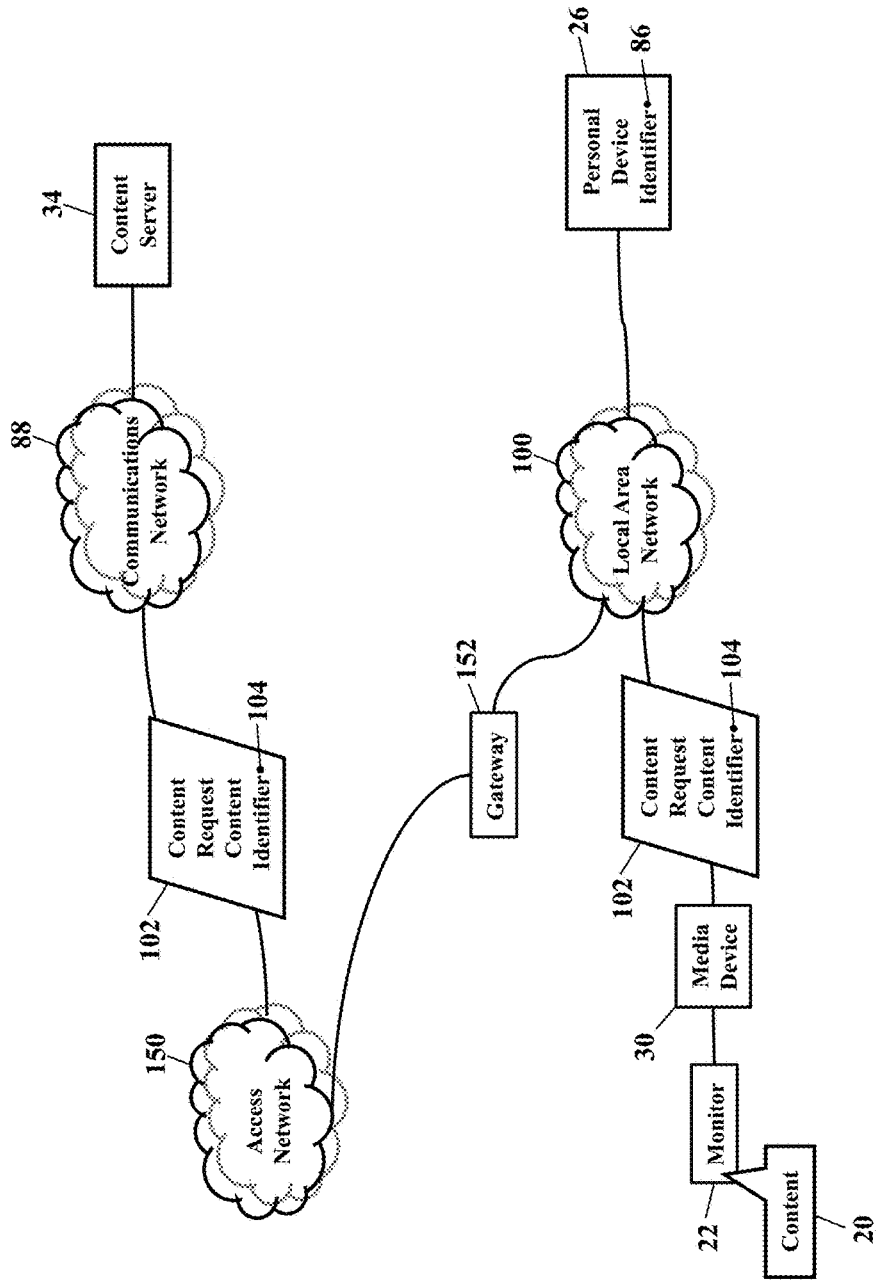
FIGS. 13-15 are schematics illustrating automatic generation of an enhanced sharing request, according to exemplary embodiments.
Figure 14:
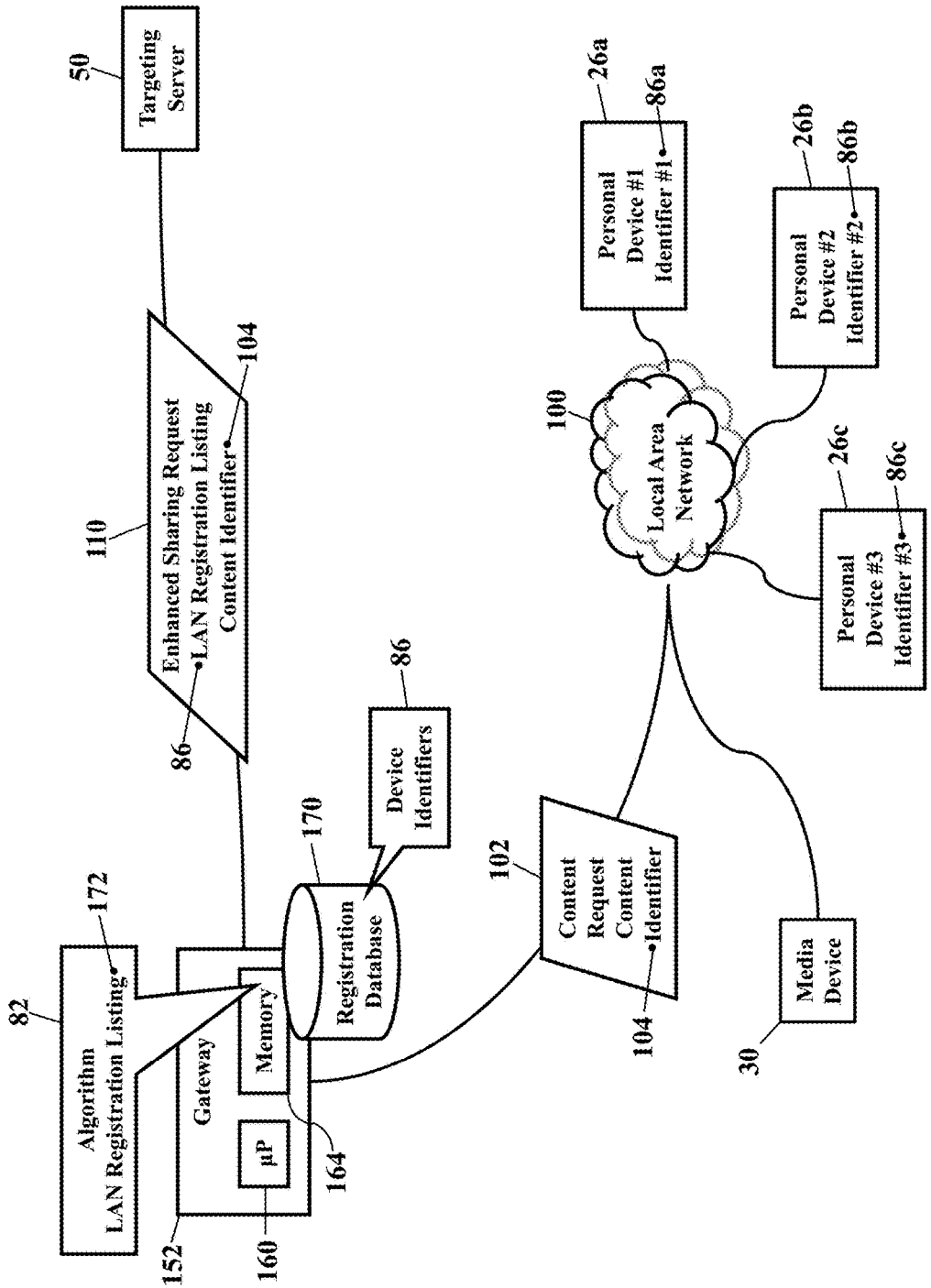
Figure 15:
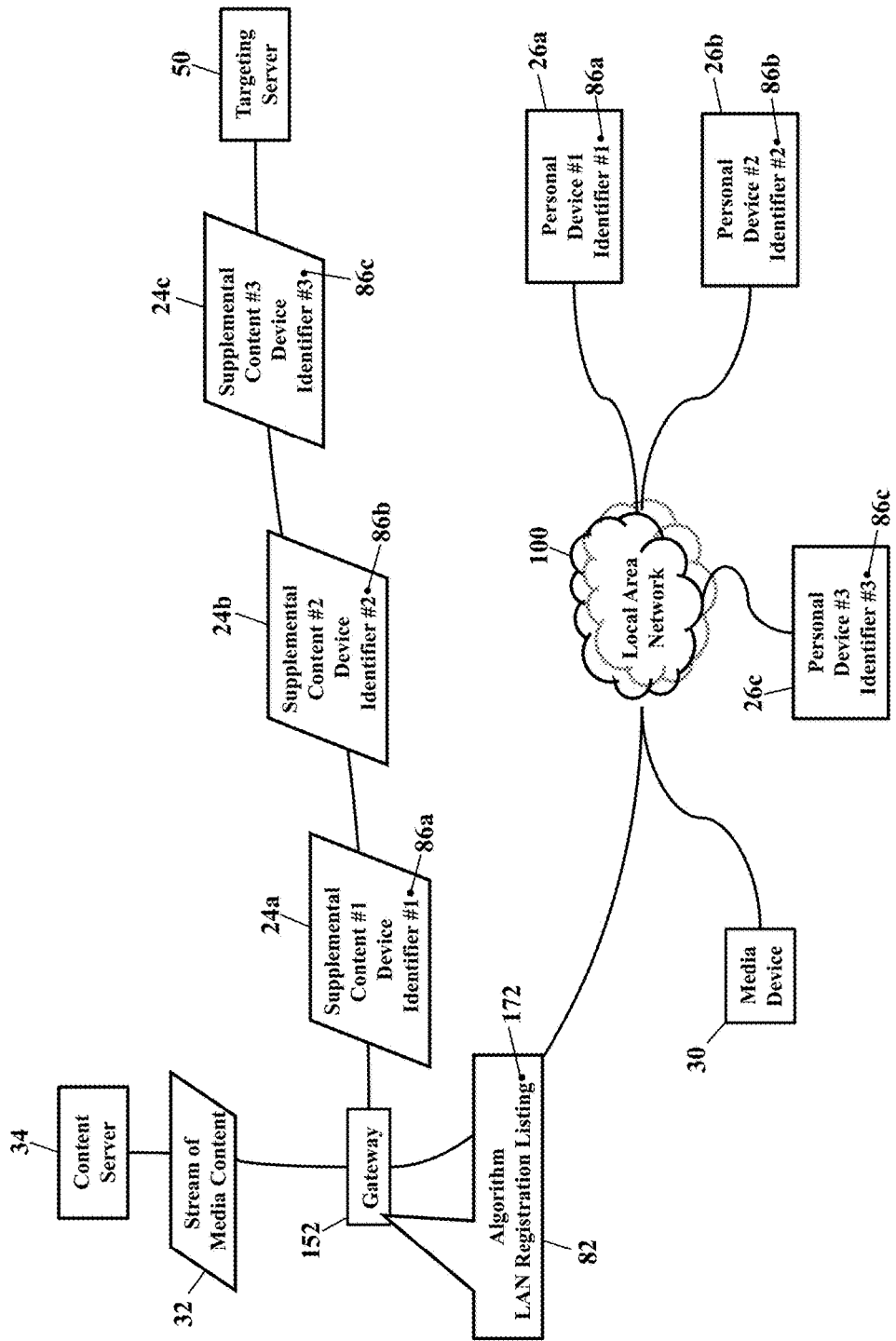

FIGS. 13-15 are schematics illustrating automatic generation of the enhanced sharing request 110, according to exemplary embodiments. Here the gateway 152 may relieve the media device 30 of responsibility for collecting the device identifiers 86. When the media device 30 is commanded or instructed to retrieve the content 20, the media device 30 generates the content request 102. The content request 102 routes along the local area network 100 to the gateway 152, which provides an interface to the access network 152 to the Internet. Here, when the gateway 152 receives the content request 102, the gateway 152 may route the content request 102 into the access network 152 and on to the content server 34.

FIG. 14 illustrates the enhanced sharing request 110. Here the gateway 152 may automatically generate the enhanced sharing request 110. The gateway 152 has a processor 160 (e.g., "µP"), application specific integrated circuit (ASIC), or other component that executes some or all of the algorithm 82 stored in a local memory 164. The algorithm 82 instructs the processor 160 to perform operations, such as generating the enhanced sharing request 110 whenever the content request 102 is received from the local area network 100. That is, whenever any movie, music, or other content is requested from any device registered with the local area network 100, the algorithm 82 may cause the gateway 152 to automatically generate the enhanced sharing request 110 in response. The gateway 152, for example, may query a registration database 170 that logs the device identifiers 86 registered to the local area network 100. The registration database 170 is illustrated as being locally stored in the memory 164 of the gateway 152, but the registration database 170 may be remotely stored and maintained by any device in the local area network 100 and/or in the communications network 88. The algorithm 82 instructs the processor 160 to retrieve or generate a LAN registration listing 172 of the device identifiers 86 that are currently registered with the local area network 100, perhaps at a timestamp of receipt of the content request 102. The algorithm 82 instructs the processor 160 to include the LAN registration listing 172 in the enhanced sharing request 110. The gateway 152 may then route the enhanced sharing request 110 to the targeting server 50 for profiling, as above explained.

FIG. 15 illustrates the supplemental content 24. When targeted profiling is accomplished, the gateway 152 receives the supplemental content 24 destined for each respective personal device 26 registered to the local area network 100. The gateway 152, for example, receives multiple, packetized streams of the supplemental content 24, each one destined for a different one of the device identifiers 86 in the LAN registration listing 172. The gateway 152 routes each different supplemental content 24 into the local area network 100 for delivery to the destination network address assigned to each respective personal device 26.

The gateway 152 thus may receive multiple streams of data. While the gateway 152 receives the stream 32 of media content from the content server 34, the gateway 152 may also receive each different stream of the supplemental content 24 targeted to each respective personal device 26. The gateway 152 routes the stream 32 of media content to the network address of the media device 30 for display by the monitor (illustrated as reference numeral 22 in FIG. 1). The gateway 152 also routes each different stream of the supplemental content 24 to the corresponding targeted, personal device 26. As the media device 30 processes the shared content 20 for display, each viewer's personal device 26 separately receives his or her corresponding supplemental content 24.

Figure 16:
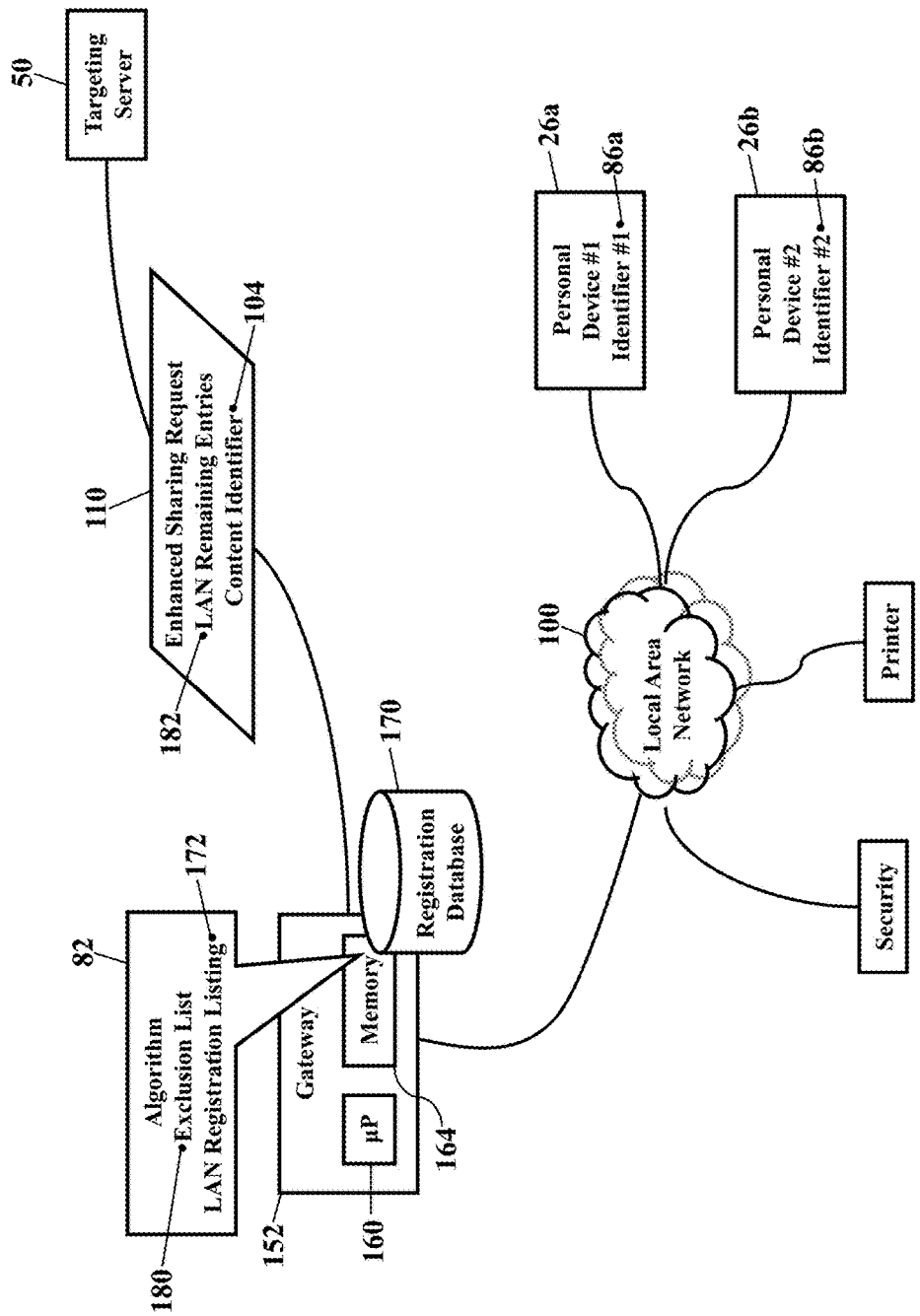
FIG. 16 is a schematic illustrating exclusion of addresses, according to exemplary embodiments.

FIG. 16 is a schematic illustrating exclusion of addresses, according to exemplary embodiments. As the reader may understand, there may be devices for which profiling is not desired. Wireless printers, for example, may be registered with the local area network 100, but marketers may not want to waste profiling efforts on devices incapable of effectively delivering video content. Likewise, wireless utility meters, security systems, and other appliances may be registered with the local area network 100, but profiling is not desired. So, when the gateway 152 queries the registration database 170, the gateway 152 may remove or cull addresses not suitable or desirable for profiling. The algorithm 82 may thus cause the gateway 152 to retrieve an exclusion list 180 of the device identifiers 86 for which profiling is not undertaken. The exclusion list 180 may be based on any criteria desired, such as a lack of video processing capability or a lack of a display device. If a device registered with the local area network 100 lacks a display device and/or video processing capability, the corresponding device identifier 86 may be added or updated to the exclusion list 180. The exclusion list 180 may further be configured with the device identifiers 86 for which profiling is simply not desired or prohibited, such as children's devices and wireless cameras. The gateway 152 may thus compare the LAN registration listing 172 to the exclusion list 180. Any matching entries are deleted or removed from the enhanced sharing request 110. The remaining entries 182 in the LAN registration listing 172 are then sent to the targeting server 50 for profiling, as above explained.

Figure 17:
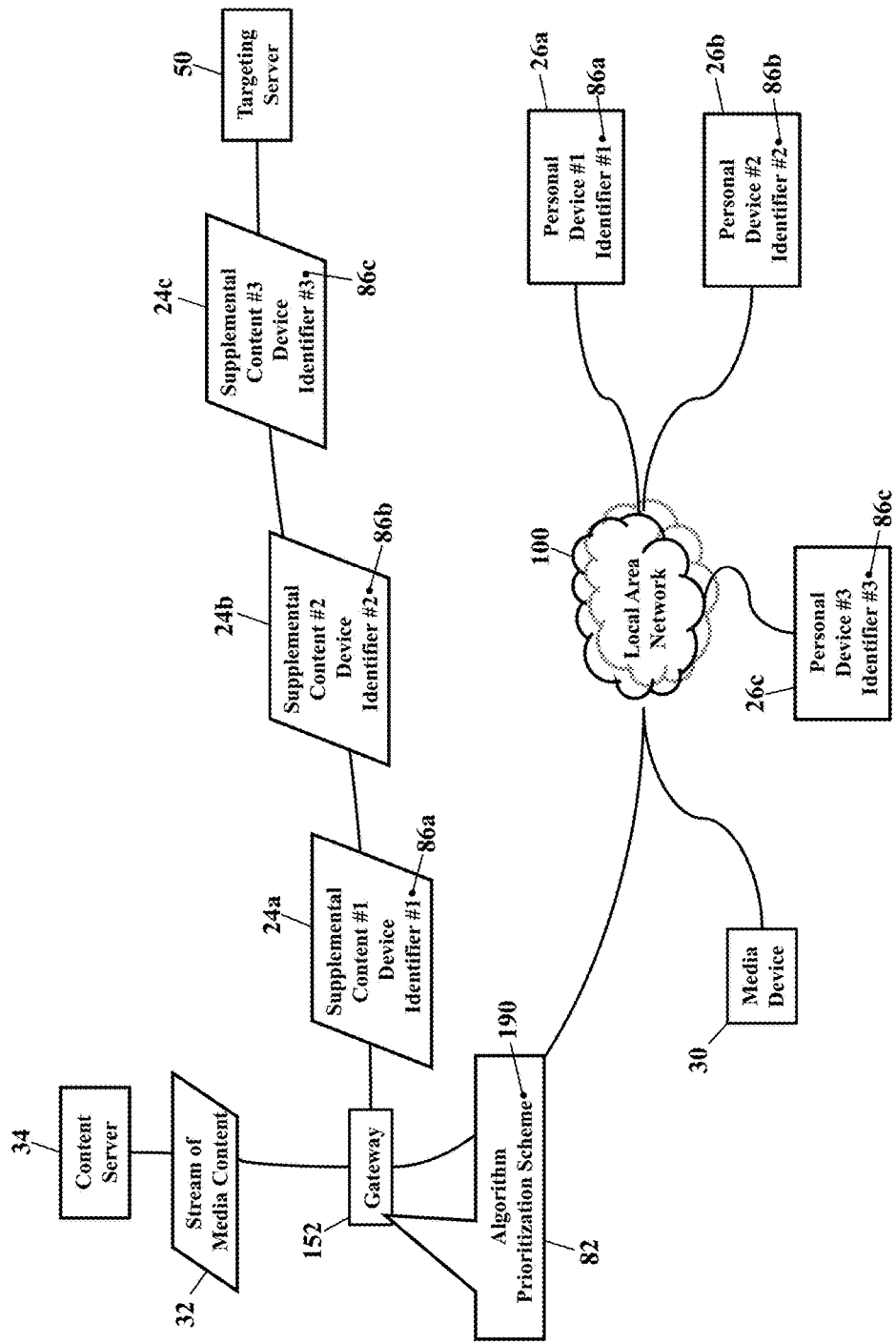
FIGS. 17-19 are schematics illustrating prioritized delivery, according to exemplary embodiments.
Figure 18:
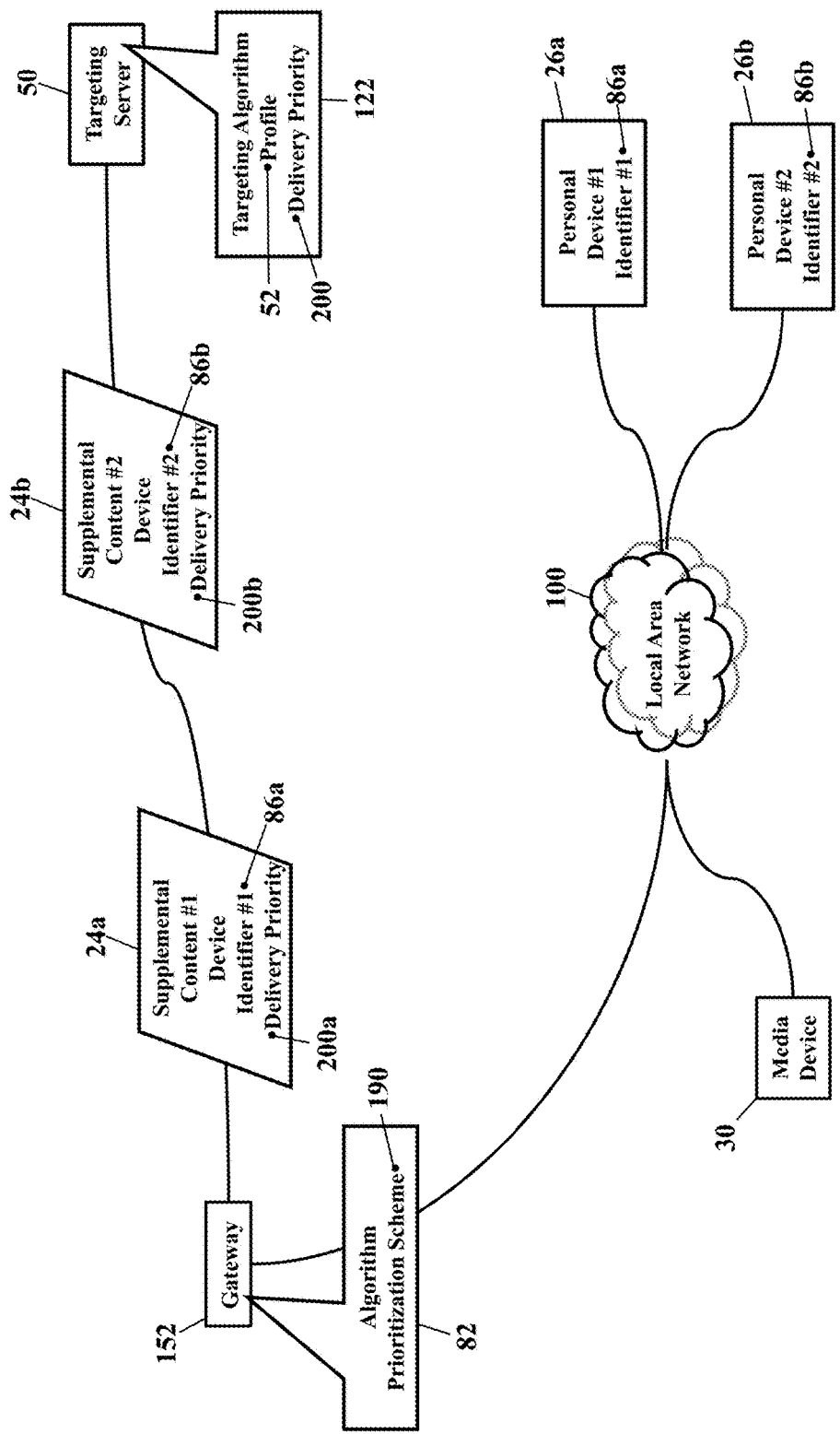
Figure 19:
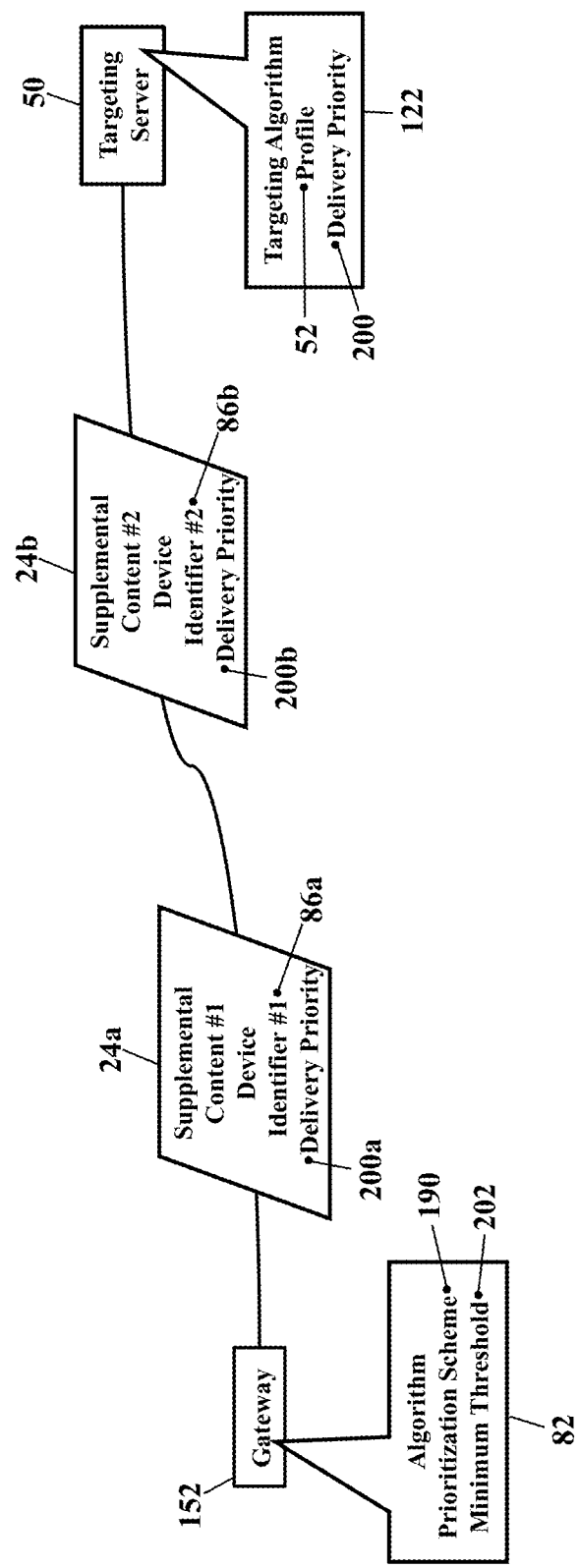

FIGS. 17-19 are schematics illustrating prioritized delivery, according to exemplary embodiments. Recall that the gateway 152 receives the receives the stream 32 of media content destined for the media device 30, along with each different stream of the supplemental content 24 targeted to each respective personal device 26 registered to the local area network 100. All these different data streams may overwhelm the bandwidth capability of the local area network 100. Exemplary embodiments, then, may retrieve and/or execute a prioritization scheme 190 that prioritizes delivery. For example, when bandwidth is constrained, the stream 32 of media content may always have first priority to ensure the shared content 20 is enjoyed. Lower levels of priority may be based on any measure or criteria.

FIG. 18 illustrates priority, as determined by the targeting server 50. As the targeting server 50 profiles each viewer's personal device 26 (as above explained), the targeting server 50 may assign a delivery priority 200 to each different stream of the supplemental content 24. The delivery priority 200 may be based on any relative worth of the viewer, based on the corresponding profile 52 of her personal device 26. For example, if the profile 52 demographically indicates a wealthy viewer, perhaps that viewer has a higher advertising worth and a corresponding higher delivery priority 200. Likewise, if the profile 52 has an attractive correlation to the unique content identifier (illustrated as reference numeral 104) of the requested content 20 and/or the targeted supplemental content 24, the viewer may have a high probability of responding with a purchase. The supplemental content 24 may again have a higher delivery priority 200. Conversely, if the viewer has little advertising worth, for whatever reason, the targeting server 50 may assign a low value to the delivery priority 200. The targeting server 50 may thus include the delivery priority 200 in the supplemental content 24, such as information in a header or payload packet. When the gateway 152 receives any supplemental content 24, the gateway 152 may inspect and prioritize delivery based on the embedded or included delivery priority 200. The gateway 152 may thus queue higher scoring supplemental content 24 for delivery prior to lower scored supplemental content 24.

FIG. 18 illustrates refusals of delivery. None of us want advertising with little relevance. Exemplary embodiments, then, may implement a minimum threshold 202 for delivery of any supplemental content 24. As the gateway 152 inspects the supplemental content 24 for the delivery priority 200, the algorithm 82 may cause the gateway 152 to compare the delivery priority 200 to the minimum threshold 202. The minimum threshold 202 is a configurable value or score at which the gateway 152 refuses to receive or deliver the corresponding supplemental content 24. If the delivery priority 200 equals or exceeds the minimum threshold 202, the gateway 152 accepts the supplemental content 24 and queues for delivery. If the delivery priority 200 is less than the minimum threshold 202, the gateway 152 may refuse receipt or fail to route the corresponding supplemental content 24.

Figure 20:
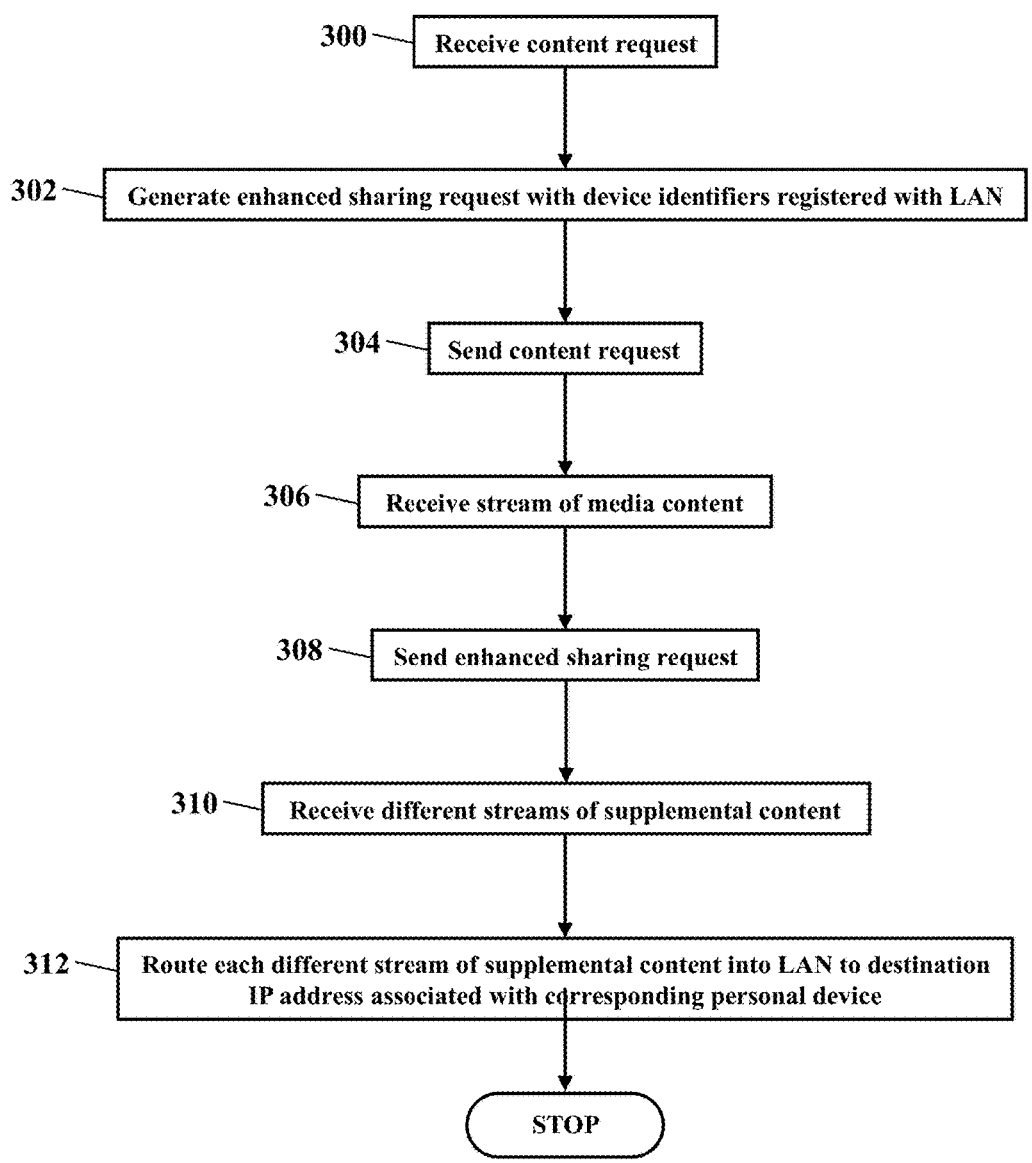
FIG. 20 is a flowchart illustrating enhanced shared experiences, according to exemplary embodiments.

FIG. 20 is a flowchart illustrating enhanced shared experiences, according to exemplary embodiments. The content request 102 is received (Block 300). The enhanced sharing request 110 is generated to include the device identifiers 86 of the personal devices 26 registered with the local area network 100 (Block 302). The content request 102 is sent (Block 304) and the corresponding stream 32 of media content is received (Block 306). The enhanced sharing request 110 is sent (Block 308) and the different streams of the supplemental content 24 are received (Block 310). Each different supplemental content 24 is routed into the local area network 100 to the destination Internet Protocol address associated with the corresponding personal device 26 (Block 312).

Figure 21:
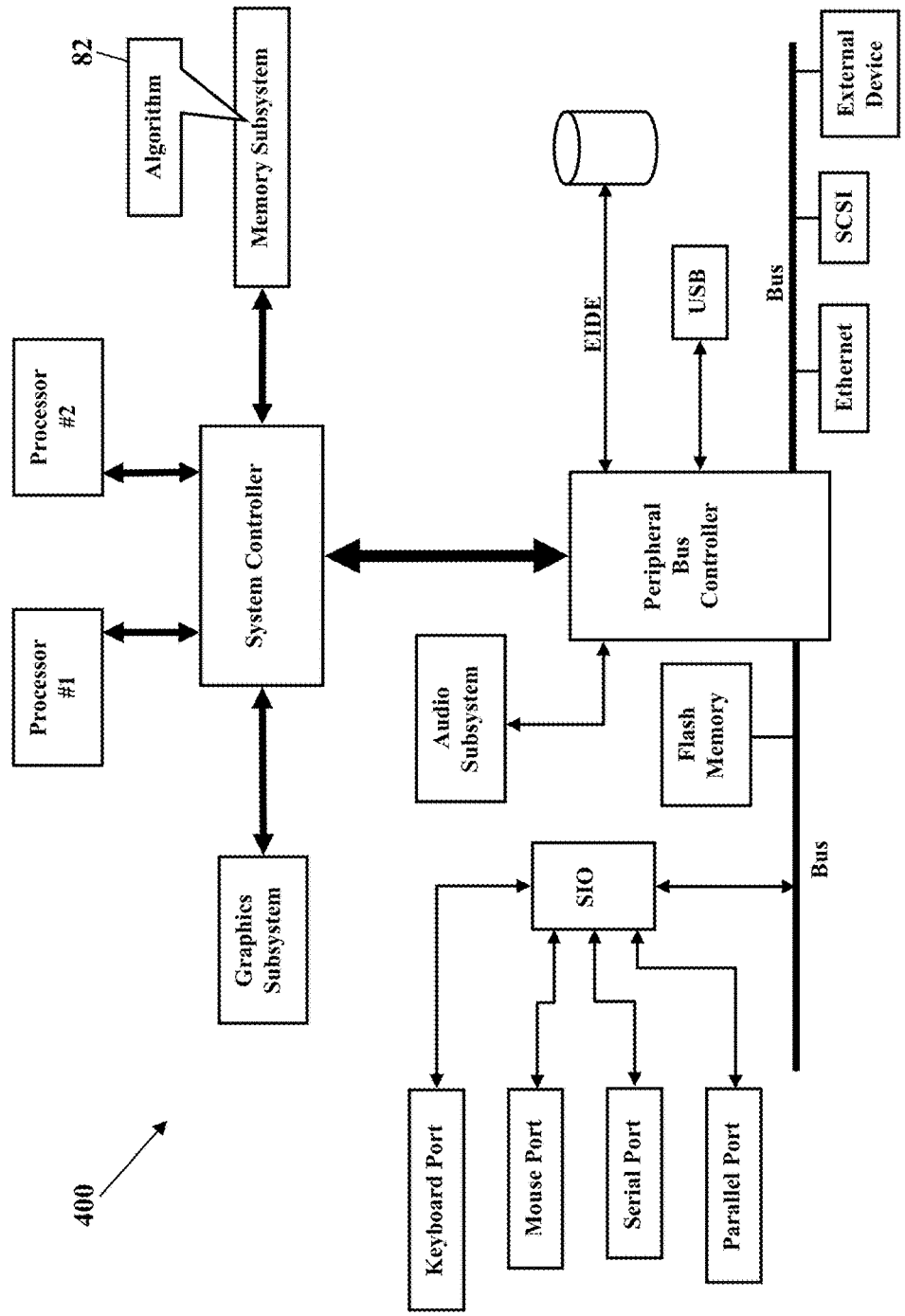
FIGS. 21-22 depict still more operating environments for additional aspects of the exemplary embodiments.

FIG. 21 is a schematic illustrating still more exemplary embodiments. FIG. 21 is a more detailed diagram illustrating a processor-controlled device 400. As earlier paragraphs explained, the algorithm 82 may operate in any processor-controlled device. FIG. 21, then, illustrates the algorithm 82 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 22:
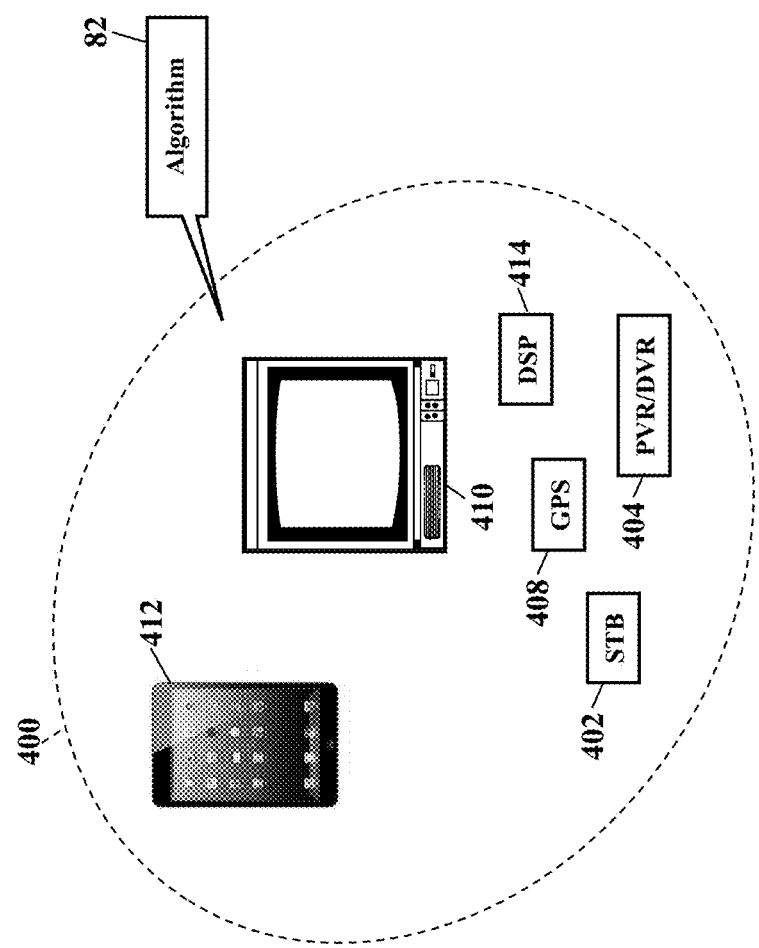

FIG. 22 depicts other possible operating environments for additional aspects of the exemplary embodiments. FIG. 22 illustrates the algorithm 82 operating within various other processor-controlled devices 400. FIG. 22, for example, illustrates that the algorithm 82 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing the processor 60 and/or a digital signal processor (DP/DSP) 414. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for enhanced shared media experiences, as the above paragraphs explained.

Exemplary embodiments may be applied regardless of networking environment. Exemplary embodiments may be easily adapted to any devices having cellular, WI-FI®, and/or BLUETOOTH® capability. Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, the local-area network 100 (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. The processors explained herein could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
   a processor; and
   a memory storing instructions that when executed cause the processor to perform operations, the operations comprising:
   receiving a content request for content sent from a media device registered with a local area network;
   identifying a first personal device of a first user and a second personal device of a second user located within a viewing area of a single common display;
   retrieving a phone number of the first personal device and a phone number of the second personal device registered with the local area network;
   obtaining a first user profile corresponding to the phone number of the first personal device;
   obtaining a second user profile corresponding to the phone number of the second personal device;
   routing, to the media device, a stream of media content that corresponds to the content request for the content;
   determining whether any of the phone number of the first personal device and the phone number of the second personal device is included in an exclusion list;
   when the phone number of the first personal device or the phone number of the second personal device is included in the exclusion list, omitting to provide supplemental content to the phone number included in the exclusion list;
   when the phone number of the first personal device and the phone number of the second personal device are omitted from the exclusion list:
     determining a priority set for the first user profile;
     determining a priority set for the second user profile;

comparing the priorities set for the first user profile and the second user profile with a minimum threshold;
when the priority set for the first user profile or the priority set for the second user profile is below the minimum threshold, refusing routing of corresponding supplemental content to the user profile below the minimum threshold;
when the priorities set for the first user profile and the second user profile are equal to or above the minimum threshold:
routing, based on the phone number of the first personal device and separate from the media content to the first personal device, a first stream of supplemental content corresponding to the first user profile;
routing, based on the phone number of the second personal device and separate from the media content to the second personal device, a second stream of supplemental content corresponding to the second user profile;
displaying, on the single common display that is connected to the media device but not to the first and second personal devices, the media content corresponding to the content request;
displaying, on a display of the first personal device but not on a display of the second personal device and not on the common display, the first supplemental content corresponding to the first user profile; and
displaying, on the display of the second personal device but not on the display of the first personal device and not on the common display, the second supplemental content corresponding to the second user profile,
wherein the media content, the first supplemental content and the second supplemental content are provided contemporaneously to both the first personal device and the second personal device, respectively,
wherein the first stream of supplemental content is tailored to the first user profile and unavailable to the second personal device,
wherein the second stream of supplemental content is tailored to the second user profile and unavailable to the first personal device, and
wherein the supplemental contents are routed to the first personal device and the second personal device in an order according to the priorities set to the first user profile and the second user profile.

2. The system of claim 1, wherein the operations further comprise routing each one of the first and second streams of supplemental content into the local area network based on a score.

3. The system of claim 1, wherein the operations further comprise routing the content request to a content database.

4. The system of claim 1, wherein the operations further comprise routing the phone numbers to a targeting server for profiling.

5. The system of claim 1, wherein the operations further comprise excluding one of the phone numbers.

6. The system of claim 1, wherein the operations further comprise routing the phone numbers and a content identifier of the content to a targeting server for profiling.

7. A method, comprising:
receiving a content request for content sent from a media device registered with a local area network;
identifying a first personal device of a first user and a second personal device of a second user located within a viewing area of a single common display;
retrieving a phone number of the first personal device and a phone number of the second personal device registered with the local area network;
obtaining a first user profile corresponding to the phone number of the first personal device;
obtaining a second user profile corresponding to the phone number of the second personal device;
routing, to the media device, a stream of media content that corresponds to the content request for the content;
determining whether any of the phone number of the first personal device and the phone number of the second personal device is included in an exclusion list;
when the phone number of the first personal device or the phone number of the second personal device is included in the exclusion list, omitting to provide supplemental content to the phone number included in the exclusion list;
when the phone number of the first personal device and the phone number of the second personal device are omitted from the exclusion list:
determining a priority set for the first user profile;
determining a priority set for the second user profile;
comparing the priorities set for the first user profile and the second user profile with a minimum threshold;
when the priority set for the first user profile or the priority set for the second user profile is below the minimum threshold, refusing routing of corresponding supplemental content to the user profile below the minimum threshold;
when the priorities set for the first user profile and the second user profile are equal to or above the minimum threshold:
routing, based on the phone number of the first personal device and separate from the media content to the first personal device, a first stream of supplemental content corresponding to the first user profile;
routing, based on the phone number of the second personal device and separate from the media content to the second personal device, a second stream of supplemental content corresponding to the second user profile;
displaying, on the single common display that is connected to the media device but not to the first and second personal devices, the media content corresponding to the content request;
displaying, on a display of the first personal device but not on a display of the second personal device and not on the common display, the first supplemental content corresponding to the first user profile; and
displaying, on the display of the second personal device but not on the display of the first personal device and not on the common display, the second supplemental content corresponding to the second user profile,
wherein the media content, the first supplemental content and the second supplemental content are provided contemporaneously to both the first personal device and the second personal device, respectively,
wherein the first stream of supplemental content is tailored to the first user profile and unavailable to the second personal device, wherein the second stream of supplemental content is tailored to the second user profile and unavailable to the first personal device, and wherein the supplemental contents are routed to the first personal device and the second personal device in an order according to the priorities set to the first user profile and the second user profile.

8. The method of claim 7, further comprising routing each one of the first and second streams of supplemental content based on a score.

9. The method of claim 7, further comprising routing the content request to a content database.

10. The method of claim 7, further comprising routing the phone numbers to a targeting server for profiling.

11. The method of claim 7, further comprising excluding one of the phone numbers.

12. The method of claim 7, further comprising routing the phone numbers and a content identifier of the content to a targeting server for profiling.

13. A non-transitory computer readable storage medium storing instructions that when executed cause a processor to perform operations, the operations comprising:

receiving a content request for content sent from a media device registered with a local area network;

identifying a first personal device of a first user and a second personal device of a second user located within a viewing area of a single common display;

retrieving a phone number of the first personal device and a phone number of the second personal device registered with the local area network;

obtaining a first user profile corresponding to the phone number of the first personal device;

obtaining a second user profile corresponding to the phone number of the second personal device;

routing, to the media device, a stream of media content that corresponds to the content request for the content;

determining whether any of the phone number of the first personal device and the phone number of the second personal device is included in an exclusion list;

when the phone number of the first personal device or the phone number of the second personal device is included in the exclusion list, omitting to provide supplemental content to the phone number included in the exclusion list;

when the phone number of the first personal device and the phone number of the second personal device are omitted from the exclusion list:

determining a priority set for the first user profile;

determining a priority set for the second user profile;

comparing the priorities set for the first user profile and the second user profile with a minimum threshold;

when the priority set for the first user profile or the priority set for the second user profile is below the minimum threshold, refusing routing of corresponding supplemental content to the user profile below the minimum threshold;

when the priorities set for the first user profile and the second user profile are equal to or above the minimum threshold:

routing, based on the phone number of the first personal device and separate from the media content to the first personal device, a first stream of supplemental content corresponding to the first user profile;

routing, based on the phone number of the second personal device and separate from the media content to the second personal device, a second stream of supplemental content corresponding to the second user profile;

displaying, on the single common display that is connected to the media device but not to the first and second personal devices, the media content corresponding to the content request;

displaying, on a display of the first personal device but not on a display of the second personal device and not on the common display, the first supplemental content corresponding to the first user profile; and displaying, on the display of the second personal device but not on the display of the first personal device and not on the common display, the second supplemental content corresponding to the second user profile, wherein the media content, the first supplemental content and the second supplemental content are provided contemporaneously to both the first personal device and the second personal device, respectively, wherein the first stream of supplemental content is tailored to the first user profile and unavailable to the second personal device, wherein the second stream of supplemental content is tailored to the second user profile and unavailable to the first personal device, and wherein the supplemental contents are routed to the first personal device and the second personal device in an order according to the priorities set to the first user profile and the second user profile.

14. The non-transitory computer readable storage medium of claim 13, wherein the operations further comprise routing each one of the first and second streams of supplemental content into the local area network based on a score.

15. The non-transitory computer readable storage medium of claim 13, wherein the operations further comprise routing the content request to a content database.

16. The non-transitory computer readable storage medium of claim 13, wherein the operations further comprise routing the phone numbers to a targeting server for profiling.

17. The non-transitory computer readable storage medium of claim 13, wherein the operations further comprise excluding one of the phone numbers.

* * * * *